United States Patent
Yamamoto (10) Patent No.: US 10,239,497 B2
(45) Date of Patent: Mar. 26, 2019

(54) MOUNTING STRUCTURE FOR WATER BLOCKING CAP IN WIPER DEVICE, METHOD FOR MOUNTING WATER BLOCKING CAP, AND WIPER DEVICE

(71) Applicant: TOYOTA JIDOSHA KABUSHIKI KAISHA, Toyota-shi, Aichi-ken (JP)

(72) Inventor: Yohei Yamamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 15/476,305

(22) Filed: Mar. 31, 2017

(65) Prior Publication Data

US 2018/0022321 A1 Jan. 25, 2018

(30) Foreign Application Priority Data

Jul. 22, 2016 (JP) ................. 2016-144374

(51) Int. Cl.
- *B60S 1/04* (2006.01)
- *B60S 1/34* (2006.01)
- *B60R 13/07* (2006.01)

(52) U.S. Cl.
CPC ........... *B60S 1/3425* (2013.01); *B60S 1/0491* (2013.01); *B60S 1/349* (2013.01); *B60S 1/3479* (2013.01); *B60R 13/07* (2013.01); *B60S 1/0433* (2013.01)

(58) Field of Classification Search
CPC ...... B60S 1/3443; B60S 1/3479; B60S 1/349; B60S 1/0491; B60S 1/0458; B60S 1/0463; B60S 1/0433; B60S 1/0472; B60S 1/0436; B60S 1/3425; B60R 13/07

USPC ...... 15/250.3, 250.31; 296/96.15, 96.17, 192
See application file for complete search history.

(56) References Cited

U.S. PATENT DOCUMENTS

| | | | |
|---|---|---|---|
| 2004/0034959 A1* | 2/2004 | Nakamura | B60S 1/0425 15/250.31 |
| 2006/0005341 A1* | 1/2006 | Lee | B60S 1/0433 15/250.31 |
| 2012/0297566 A1* | 11/2012 | Motono | B60S 1/0425 15/250.31 |

FOREIGN PATENT DOCUMENTS

| | | |
|---|---|---|
| JP | 2004-017894 A | 1/2004 |
| JP | 2005-324710 | * 11/2005 |
| JP | 2007-196959 A | 8/2007 |
| JP | 2015-110362 A | 6/2015 |

* cited by examiner

*Primary Examiner* — Gary K. Graham
(74) *Attorney, Agent, or Firm* — Oliff PLC (57) ABSTRACT

A mounting structure for a water blocking cap is adapted to a wiper device that includes a shaft holder and a water blocking cap. The shaft holder includes a stem and a fixed portion. The water blocking cap includes a mounting portion and a water receiver. One of the shaft holder and the water blocking cap includes a guide portion that moves the water blocking cap in a direction intersecting with the axial direction of the stem. In a mounted state in which the mounting portion is mounted to the stem, a part of the water receiver is arranged in a position that is closer to the proximal side of the stem than the fixed portion and in which the part overlaps with the fixed portion as viewed from the axial direction of the stem.

5 Claims, 6 Drawing Sheets

MOUNTING STRUCTURE FOR WATER BLOCKING CAP IN WIPER DEVICE, METHOD FOR MOUNTING WATER BLOCKING CAP, AND WIPER DEVICE

BACKGROUND OF THE INVENTION

The present invention relates to a mounting structure for a water blocking cap in a wiper device, a method for mounting a water blocking cap, and a wiper device.

The wiper device disclosed in Japanese Laid-Open Patent Publication No. 2015-110362 includes a shaft holder configured to support a pivot shaft of a wiper arm and a water blocking cap covering the shaft holder from above. The shaft holder includes a tubular stem through which the pivot shaft is inserted and a fixed portion that extends outward in the vehicle width direction from the outer peripheral surface of the stem. The fixed portion is fixed to the vehicle body. The water blocking cap includes a mounting portion through which the stem of the shaft holder is inserted and a water receiver extending radially outward from the outer peripheral surface of the mounting portion. The water receiver constitutes a flow path for receiving water, such as rain water, and draining it in a predetermined direction.

In order to increase the area on the windshield wiped by the wiper device described in the above publication, it is effective to arrange the pivot shaft and the stem of the shaft holder, which supports the pivot shaft, as close to the outer end in the vehicle width direction as possible. When the stem of the shaft holder is located close to the outer end in the vehicle width direction, the part of the fixed portion that is fixed to the vehicle body is close to the stem. In this configuration, components are packed in a small area. In such a case, there is a possibility that the water blocking cap will interfere with the fixed portion of the shaft holder when the water blocking cap is mounted to the stem of the shaft holder. Therefore, the water blocking cap must be shaped so as not to interfere with the fixed portion of the shaft holder at the time of the mounting operation. This may prevent the water receiver of the water blocking cap from being arranged at a desired position where it should be arranged.

SUMMARY OF THE INVENTION

It is an objective of the present invention to enable a part of a water receiver of a water blocking cap to be arranged at a desired position without interfering with the fixed portion of a shaft holder.

To achieve the foregoing objective and in accordance with a first aspect of the present invention, a mounting structure for a water blocking cap is provided. The mounting structure is adapted to a wiper device that includes a shaft holder that pivotally supports a pivot shaft of a wiper arm and a water blocking cap configured to be mounted to the shaft holder. The shaft holder includes a tubular stem configured such that the pivot shaft is inserted through the stem, and a fixed portion configured to extend from the stem and outward in a radial direction of the stem and to be fixed to a vehicle body. The water blocking cap includes a mounting portion mounted to the stem, and a water receiver that is connected to the mounting portion and constitutes a flow path configured to drain water in a predetermined direction. One of the shaft holder and the water blocking cap includes a guide portion. When the water blocking cap is mounted to the stem by moving the water blocking cap from a distal side toward a proximal side of the stem, the guide portion contacts a part of the other one of the shaft holder and the water blocking cap, thereby moving the water blocking cap in a direction intersecting with an axial direction of the stem. In a mounted state in which the mounting portion is mounted to the stem, a part of the water receiver is arranged in a position that is closer to the proximal side of the stem than the fixed portion and in which the part overlaps with the fixed portion as viewed from the axial direction of the stem.

With the mounting portion of the water blocking cap mounted to the stem of the shaft holder, part of the water receiver of the water blocking cap may be desired to be located in a position that is closer to the proximal side than the fixed portion and in which the cap is overlapped with the fixed portion as viewed from the axial direction of the stem in order to catch water, such as rain water.

In such a case, it is desirable to avoid interference between the water receiver and the fixed portion of the shaft holder. In this regard, when mounting the mounting portion of the water blocking cap to the stem of the shaft holder, it is effective to move the water blocking cap in a direction intersecting with the axial direction of the stem while moving the cap toward the proximal side from the distal side of the stem.

With the mounting structure described above, the movement of the water blocking cap in a direction intersecting with the axial direction of the stem of the shaft holder is enabled by contact between the guide portion and one of the shaft holder and the water blocking cap that does not include the guide portion. Therefore, when mounting the water blocking cap, even if no force in a direction intersecting with the axial direction of the stem of the shaft holder is applied to the water blocking cap, the water blocking cap is also allowed to be moved in a direction intersecting with the axial direction of the stem by utilizing some of the force for moving the cap toward the proximal side from the distal side of the shaft holder.

That is, with the above configuration, a simple mounting operation of moving the water blocking cap from the distal side toward the proximal side of the stem of the shaft holder allows the water receiver to be arranged on the proximal side in the axial direction of the stem in the fixed portion of the shaft holder, while preventing the water receiver from interfering with the fixed portion of the shaft holder.

With the above described method, the mounting portion of the water blocking cap is moved in a direction intersecting with the axial direction of the stem of the shaft holder, while moving the mounting portion from the distal side toward the proximal side of the stem of the shaft holder. When starting the operation of mounting the mounting portion of the water blocking cap to the stem of the shaft holder, the water receiver is located in a position not overlapping with the fixed portion as viewed from the axial direction of the stem. As the mounting operation progresses, the water receiver is allowed to be arranged in a position that is closer to the proximal side than the fixed portion and in which the water receiver overlaps with the fixed portion as viewed from the axial direction of the stem. As described above, with the above described method, it is possible to arrange the water blocking cap on the proximal side in the axial direction of the stem in the fixed portion of the shaft holder, while preventing the water receiver of the water blocking cap from interfering with the fixed portion of the shaft holder. That is, the water receiver of the water blocking cap is allowed to be arranged in a desired position to receive rain water and the like.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A mounting structure for a water blocking cap according to one embodiment will now be described. The water blocking cap is employed in a wiper device. First, the overall configuration of the wiper device will be described with reference to FIG. 1. In the following description, it is assumed that the right side in FIG. 1 is the driver side and the left side is the passenger side.

Figure 1:
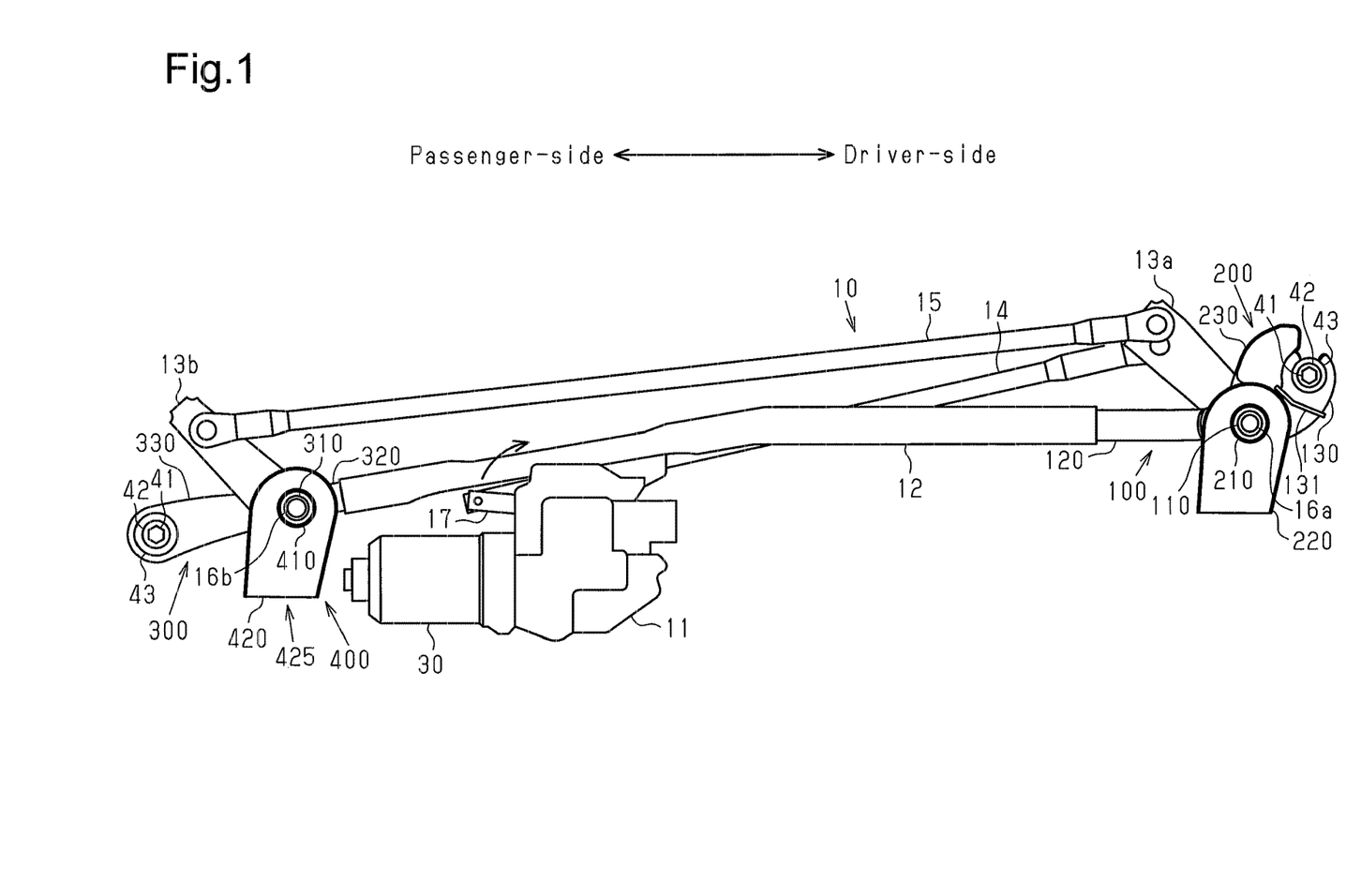
FIG. 1 is a plan view showing a link portion of a wiper device including a water blocking cap and a shaft holder on the driver side to which a mounting structure according to one embodiment is applied.

As shown in FIG. 1, the wiper device includes a pivot shaft 16a to which the driver-side wiper arm is mounted and a pivot shaft 16b to which a passenger-side wiper arm is mounted. The pivot shafts 16a, 16b are arranged in positions spaced apart in the vehicle width direction.

The wiper device is of the tandem system, in which both the driver-side wiper arm and the passenger-side wiper arm are stored by being laid toward the passenger side about the pivot shafts 16a, 16b. The pivot shaft 16b is positioned on the center side in the vehicle width direction, and the pivot shaft 16a is positioned on the outer side in the vehicle width direction.

As shown in FIG. 1, the pivot shaft 16a is pivotally supported by a stem 110 of a shaft holder 100 on the driver side, and the pivot shaft 16b is pivotally supported by a stem 310 of a shaft holder 300 on the passenger side. The shaft holder 100 and the shaft holder 300 are coupled to each other by a stay 12 extending in the vehicle width direction, and are respectively fixed to a frame (not shown) constituting the vehicle body.

A water blocking cap 200 is mounted to the driver-side shaft holder 100 to receive water, such as rain water. Likewise, a water blocking cap 400 is mounted to the passenger-side shaft holder 300 to receive water, such as rain water. That is, the wiper device includes the shaft holder 100 for pivotally supporting the pivot shaft 16a of the wiper arm and the water blocking cap 200 mounted to the shaft holder 100.

Figure 2:
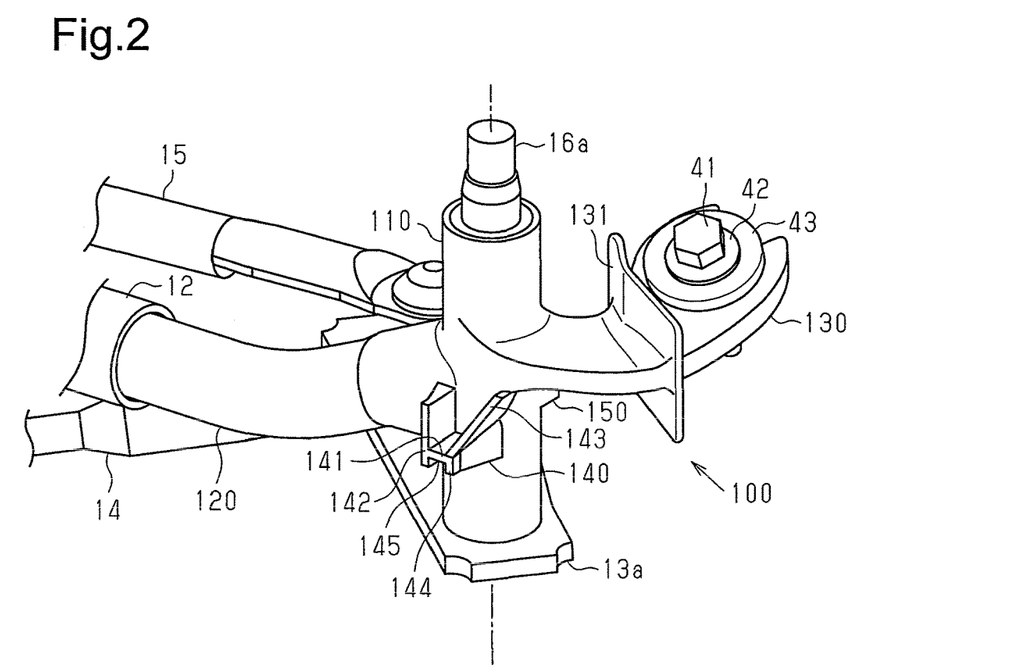
FIG. 2 is a perspective view of the driver-side shaft holder in the wiper device.

Next, the configuration of the driver-side shaft holder 100 will be described in detail with reference to FIG. 2. FIG. 2 shows the shaft holder 100 without the water blocking cap 200. As shown in FIG. 2, the shaft holder 100 has a stem 110. The stem 110 has a cylindrical shape through which the pivot shaft 16a is pivotally inserted. A coupling portion 120 extending toward the passenger side is provided near the center in the axial direction of the stem 110. The coupling portion 120 is coupled to the end on the driver side of the stay 12.

The stem 110 has a fixed portion 130 near the center in the axial direction. The fixed portion 130 extends outward in the vehicle width direction. The fixed portion 130 has a U-shaped distal end. A vibration isolation rubber member 43 and a washer 42 are stacked onto the U-shaped section of the fixed portion 130. The rubber member 43 and the washer 42 have insertion holes at the center. A bolt 41 is inserted through the insertion holes of the rubber member 43 and the washer 42 to fasten the fixed portion 130 to the frame. Also, the fixed portion 130 has a flange 131 at the center in the vehicle width direction. The flange 131 extends in the axial direction of the stem 110.

Further, the stem 110 has a guide portion 140 near the center in the axial direction. The guide portion 140 projects in the radial direction of the stem 110. When the water blocking cap 200 is mounted, the guide portion 140 guides the movement of the water blocking cap 200. The guide portion 140 has a plate-shaped bottom 141 extending in the circumferential direction of the stem 110. A wall 142 is provided at one end of the bottom 141 in the circumferential direction of the stem 110, or at a first end. The wall 142 extends from the bottom 141 in the axial direction of the stem 110 toward the distal side of the stem 110 (toward the upper side in FIG. 2). The wall 142 also extends from the bottom 141 toward the proximal side of the stem 110 (toward the lower side in FIG. 2). A plate-shaped inclined portion 143 is provided at the other end of the bottom 141 in the circumferential direction of the stem 110, or at a second end. The inclined portion 143 extends in the circumferential direction of the stem 110 and to the distal side. Specifically, the inclined portion 143 is inclined such that the closer to a side in the circumferential direction of the stem 110, that is, the closer to the bottom 141, the shorter the distance from the proximal side becomes. Further, the inclined portion 143 extends in the radial direction of the stem 110. Thus, in the guide portion 140, the distance between the wall 142 and the inclined portion 143 in the circumferential direction of the stem 110 decreases toward the proximal side of the stem 110. A side portion 144 extends toward the proximal side of the stem 110 from the second end of the bottom 141 in the circumferential direction of the stem 110. The bottom 141, the wall 142, and the side portion 144 define an engaging portion 145 on the surface of the guide portion 140 that faces the proximal side of the stem 110.

As described above, the driver-side wiper arm is mounted to the distal end of the pivot shaft 16a. As shown in FIGS. 1 and 2, the proximal end of the pivot shaft 16a is connected to the proximal end of a plate-shaped pivot lever 13a.

Like the driver-side shaft holder 100, the passenger-side shaft holder 300 has a stem 310 having a cylindrical shape as shown in FIG. 1. The stem 310 has a coupling portion 320 and a fixed portion 330. The coupling portion 320 is coupled to the end on the passenger side of the stay 12. The fixed portion 330 of the shaft holder 300 has an insertion hole at the distal end. A vibration isolation rubber member 43 and a washer 42 each having an insertion hole at center are stacked onto the part of the fixed portion 330 at which the insertion hole is provided, such that the insertion holes are aligned. The fixed portion 330 is fastened to the frame by a bolt 41 inserted through the insertion holes of the fixed portion 330, the rubber member 43, and the washer 42. The passenger-side shaft holder 300 does not have a guide portion like the one in the driver-side shaft holder 100.

As shown in FIG. 1, a proximal end of a plate-shaped pivot lever 13b is connected to the proximal end of the pivot shaft 16b inserted through the stem 310 of the shaft holder 300. An electric motor 30 is mounted to the stay 12 via a motor support portion 11. This wiper device actuates the wiper arms on the driver side and the passenger side by pivoting the pivot shafts 16a, 16b with the motor 30. The motor support portion 11 incorporates a speed reducer that couples the output shaft of the motor 30 and a crank arm 17 to each other. The crank arm 17 is pivoted in the direction of the arrow shown in FIG. 1.

One end of a driving-side link rod 14, or a first end, is pivotally coupled to the distal end of the driver-side pivot lever 13a. The distal end of the crank arm 17 is pivotally coupled to the other end of the driving-side link rod 14, that is, to a second end. A first end of an interlocking-side link rod 15 is also pivotally coupled to the distal end of the driver-side pivot lever 13a. The distal end of the passenger-side pivot lever 13b is coupled to a second end of the interlocking-side link rod 15.

As described above, in this wiper device, the crank arm 17 and the driver-side pivot lever 13a are coupled to each other by the driving-side link rod 14, and the driver-side pivot lever 13a and the passenger-side pivot lever 13b are coupled to each other by the interlocking-side link rod 15.

Thus, when the motor 30 drives the crank arm 17, the driver-side pivot lever 13a, which is connected to the crank arm 17 via the driving-side link rod 14, is pivoted about the pivot shaft 16a together with the pivot shaft 16a. When the driver-side pivot shaft 16a is pivoted, the driver-side wiper arm, which is connected to the driver-side pivot shaft 16a, is pivoted about the pivot shaft 16a.

As the driver-side pivot lever 13a is pivoted, the passenger-side pivot lever 13b, which is connected to the driver-side pivot lever 13a via the interlocking-side link rod 15, is pivoted together with the passenger-side pivot shaft 16b about the passenger-side pivot shaft 16b. When the passenger-side pivot shaft 16b is pivoted, the passenger-side wiper arm, which is connected to the passenger-side pivot shaft 16b, is pivoted about the pivot shaft 16b.

In the wiper device, the pivot levers 13a, 13b and the interlocking-side link rod 15 constitute a link mechanism 10 that interlocks the driver-side wiper arm and the passenger-side wiper arm with each other.

Figure 3:
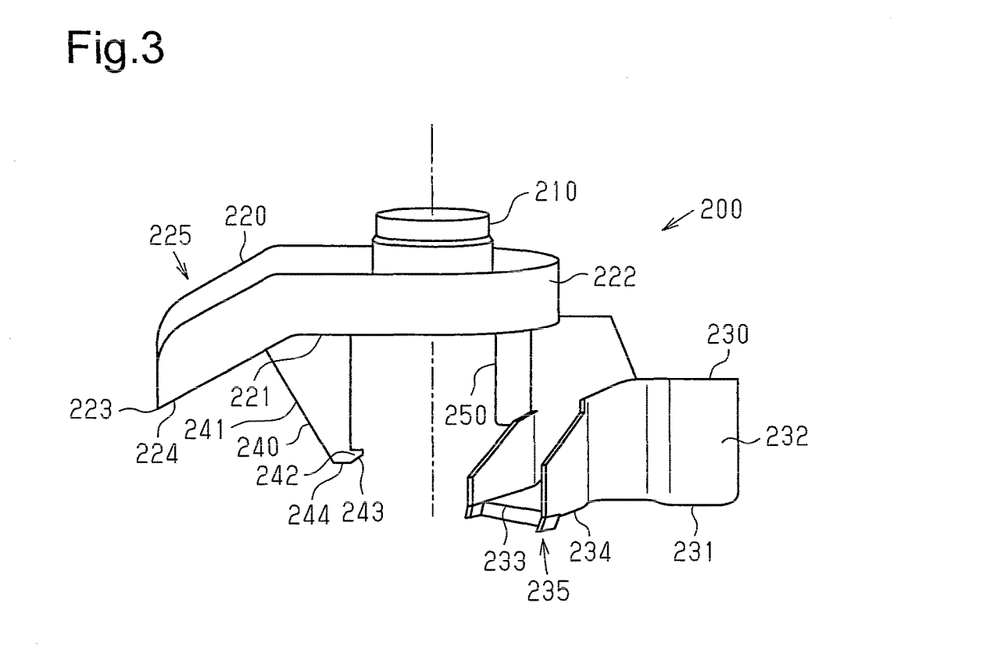
FIG. 3 is a side view of the driver-side water blocking cap in the wiper device.
Figure 4:
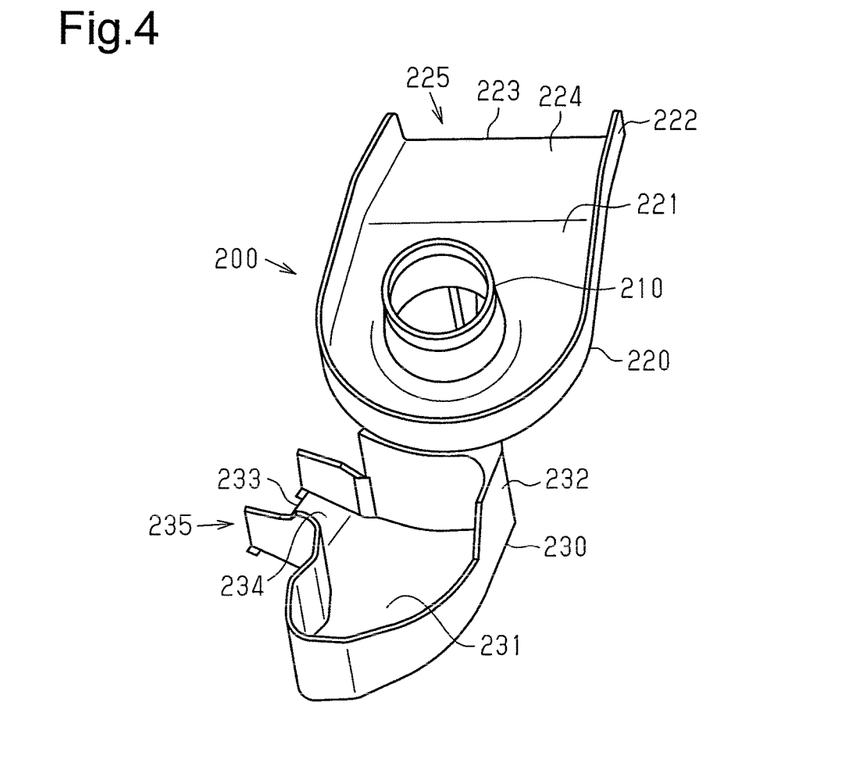
FIG. 4 is a perspective view of the driver-side water blocking cap in the wiper device.

Next, the specific configuration of the water blocking cap 200 mounted to the driver-side shaft holder 100 will be described. As shown in FIGS. 1, 3, and 4, the water blocking cap 200 includes a first water receiver 230 and a second water receiver 220 for receiving water, such as rain water.

Figure 5:
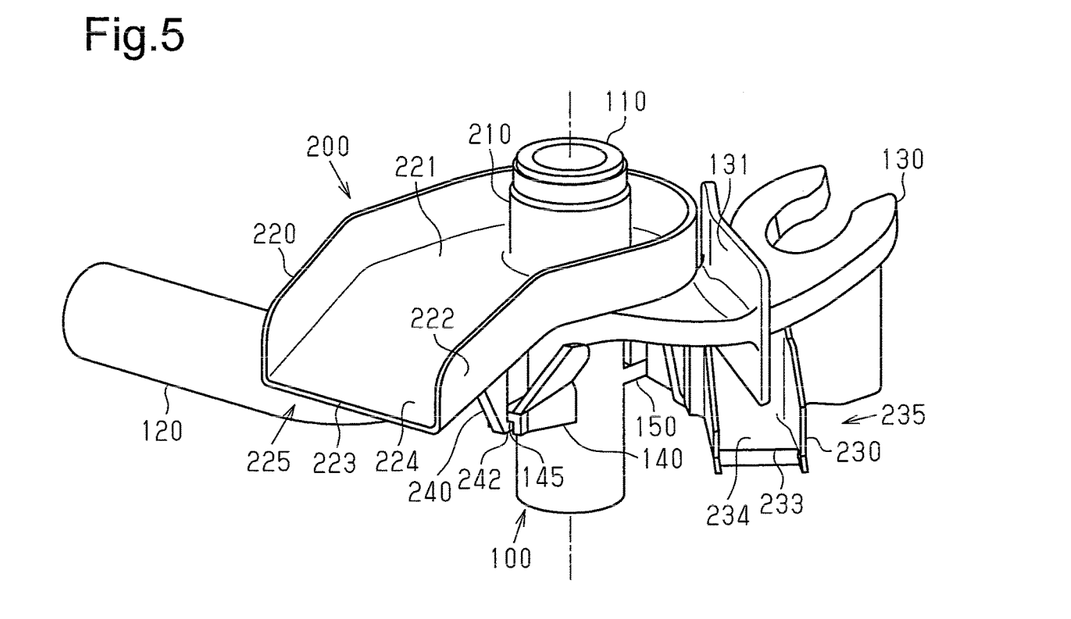
FIG. 5 is a perspective view showing a state in which the water blocking cap is mounted to the driver-side shaft holder in the wiper device.
Figure 6:
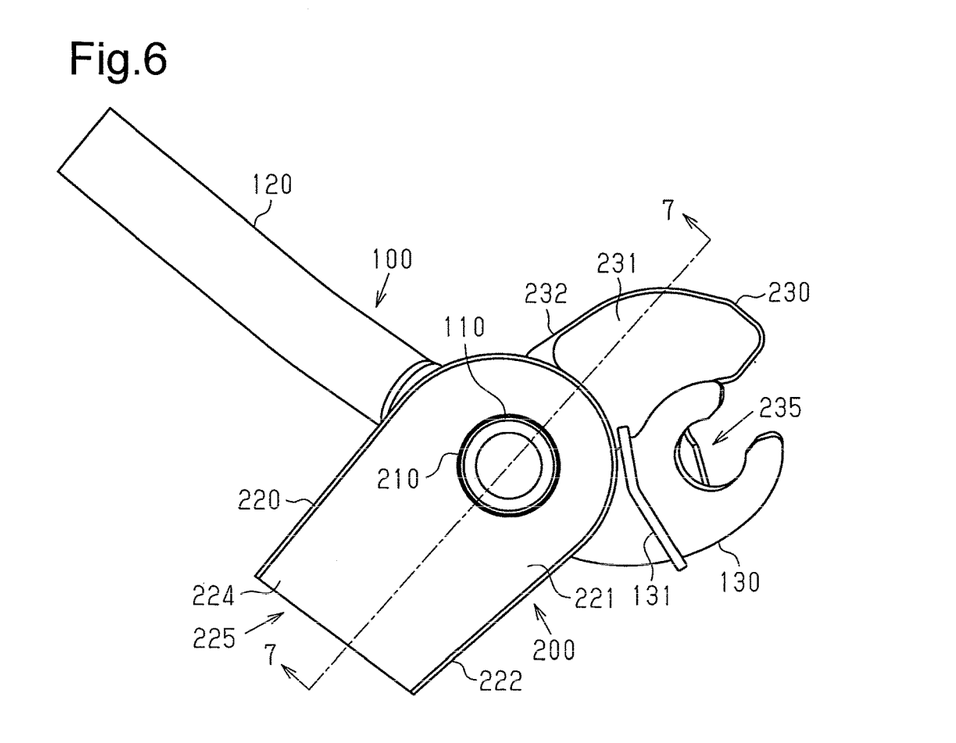
FIG. 6 is a plan view showing a state in which the water blocking cap is mounted to the driver-side shaft holder in the wiper device.
Figure 7:
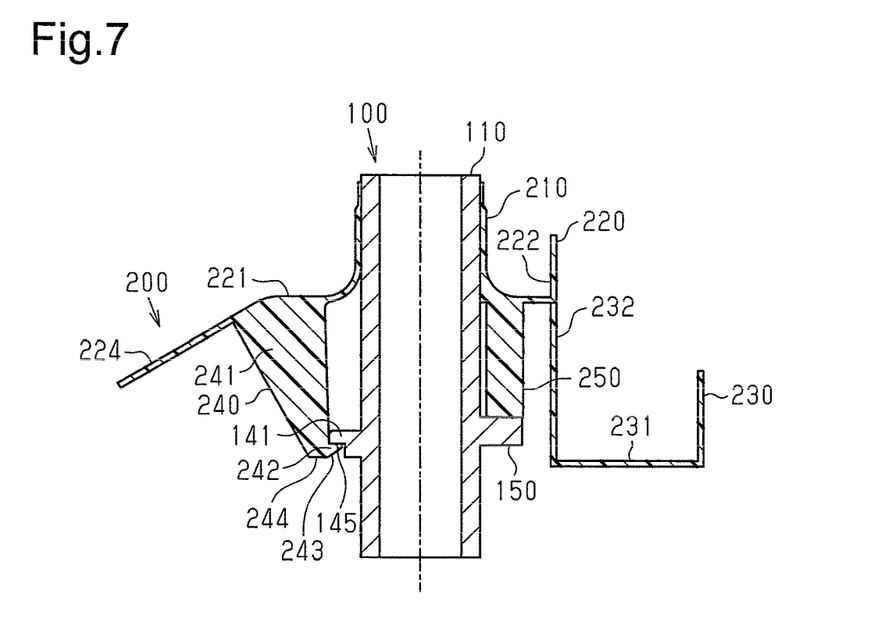
FIG. 7 is a cross-sectional view showing a state in which the water blocking cap is mounted to the driver-side shaft holder in the wiper device.

As shown in FIGS. 3 to 7, the water blocking cap 200 has a mounting portion 210. The mounting portion 210 has a cylindrical shape through which the stem 110 of the shaft holder 100 is inserted when the cap 200 is mounted to the shaft holder 100. As shown in FIGS. 5 to 7, in a state in which the water blocking cap 200 is mounted to the stem 110 of the shaft holder 100, the mounting portion 210 is configured to be located in a position to be coaxial with the stem 110. The inner diameter of the mounting portion 210 is slightly larger than the outer diameter of the stem 110. FIG. 7 is a cross-sectional view taken along line 7-7 in FIG. 6.

In the following description, the direction toward the proximal side of the pivot shaft 16a along the axis of the mounting portion 210 is defined as a proximal side of the mounting portion 210, and the direction toward the distal side of the pivot shaft 16a is defined as a distal side of the mounting portion 210. The second water receiver 220, which constitutes a flow path for draining water in a predetermined direction, is connected to the mounting portion 210.

As shown in FIG. 4, the second water receiver 220 has a plate-shaped bottom 221, which radially extends from a part on the outer circumferential surface of the mounting portion 210 that is closest to the proximal side. The bottom 221 includes an inclined surface 224.

As shown in FIGS. 5 and 7, the inclination angle of the inclined surface 224 is defined such that, when the water blocking cap 200 is mounted to the shaft holder 100, the closer to the radially outer end, the vertically lower it becomes.

As shown in FIGS. 3 and 4, an outer peripheral wall 222 is provided on the outer edge of the bottom 221. The outer peripheral wall 222 extends toward the distal side in the axial direction of the mounting portion 210 (toward the upper side in FIG. 3). However, the outer peripheral wall 222 is not provided on a distal end 223 of the inclined surface 224, which will be located at the lowest position in the bottom 221 when mounted to the shaft holder 100. As a result, the inclined surface 224 and the outer peripheral wall 222 constitute a drain port 225 for draining water in a predetermined direction from the second water receiver 220. As shown in FIG. 5, the second water receiver 220 is arranged such that, when the water blocking cap 200 is mounted to the shaft holder 100, the second water receiver 220 is positioned closer to the distal side of the stem 110 than the fixed portion 130 and closer to the passenger seat than the flange 131 of the fixed portion 330.

As shown in FIG. 7, the first water receiver 230 is connected to the bottom 221 of the second water receiver 220. The first water receiver 230 has a plate-shaped bottom 231 that spreads in the radial direction of the mounting portion 210. As shown in FIG. 4, the bottom 231 includes an inclined surface 234.

As shown in FIG. 5, the inclination angle of the inclined surface 234 is defined such that, when the water blocking cap 200 is mounted to the shaft holder 100, the closer to the distal end 233 of the inclined surface 234, the vertically lower it becomes.

As shown in FIGS. 3 and 4, an outer peripheral wall 232 is provided on the outer edge of the bottom 231. The outer peripheral wall 232 extends toward the distal side in the axial direction of the mounting portion 210 (toward the upper side in FIG. 3). However, the outer peripheral wall 232 is not provided on a distal end 233 of the inclined surface 234, which will be located at the lowest position in the bottom 231 when mounted to the shaft holder 100. As a result, the inclined surface 234 and the outer peripheral wall 232 constitute a drain port 235 for draining water from the first water receiver 230.

As shown in FIG. 4, the drain port 235 is provided on the left side of the first water receiver 230 as viewed from FIG. 4, so that water is drained from the first water receiver 230 in a direction different from the direction of the drain port 225 of the second water receiver 220.

As shown in FIG. 7, the outer peripheral wall 232 of the first water receiver 230 is connected to the bottom 221 of the second water receiver 220 at a part on the distal side in the axial direction of the mounting portion 210. That is, in the present embodiment, the first water receiver 230 is connected to the mounting portion 210 via the second water receiver 220. Thus, in the driver-side water blocking cap 200, the mounting portion 210, the second water receiver 220, and the first water receiver 230 are integrated. As shown in FIG. 3, the first water receiver 230 is located on the opposite side of the mounting portion 210 from the drain port 225 of the second water receiver 220.

As shown in FIG. 3, the water blocking cap 200 includes a guided portion 240 that contacts the guide portion 140 when the water blocking cap 200 is mounted to the shaft holder 100. The guided portion 240 is provided in the bottom 221 of the second water receiver 220 and is located closer to the drain port 225 than the mounting portion 210.

The guided portion 240 includes an extending portion 241 and an engaging projection 242. The extending portion 241 projects from the bottom 221 of the second water receiver 220 toward the proximal side in the axial direction of the mounting portion 210. The engaging projection 242 projects inward in the radial direction of the mounting portion 210 from the distal end of the extending portion 241. The extending portion 241 is shaped as a plate that extends in the axial direction of the mounting portion 210, and tapers toward the distal end. A part of the engaging projection 242 constitutes a slant 243 at the distal end of the guided portion 240 so that the engaging projection 242 tapers toward the distal end, that is, toward the inner end in the radial direction of the mounting portion 210. Further, on the distal end of the guided portion 240, a bottom surface 244 is provided in a position outward of the slant 243 in the radial direction of mounting portion 210. The bottom surface 244 is a surface perpendicular to the axial direction of the mounting portion 210.

As shown in FIG. 5, in a state in which the water blocking cap 200 is mounted to the shaft holder 100, the guided portion 240 is located in a position where the engaging projection 242 engages with the engaging portion 145 of the guide portion 140.

Also, as shown in FIGS. 3 and 7, the water blocking cap 200 also includes a leg 250 projecting from the bottom 221 of the second water receiver 220 toward the proximal side in the axial direction of the mounting portion 210. The leg 250 is located on the opposite side of the mounting portion 210 from the guided portion 240.

As shown in FIG. 7, the shaft holder 100 includes a base 150 that contacts the leg 250 in a state where the water blocking cap 200 is mounted to the shaft holder 100. As a result, when the water blocking cap 200 is mounted to the shaft holder 100, the leg 250 and the base 150 contact each other, so that the water blocking cap 200 is supported by the shaft holder 100.

As shown in FIGS. 5 and 6, in a state in which the mounting portion 210 of the water blocking cap 200 is mounted to the stem 110 of the shaft holder 100, the drain port 235 of the first water receiver 230 is arranged in a position that is closer to the proximal side than the fixed portion 130 and in which the drain port 235 overlaps with the fixed portion 130 as viewed from the axial direction of the stem 110 of the shaft holder 100. That is, in this wiper device, in a state in which the mounting portion 210 of the water blocking cap 200 is mounted to the stem 110 of the shaft holder 100, the first water receiver 230 is located in the vicinity of the fixed portion 130, and the drain port 235 is located below the fixed portion 130.

Accordingly, the driver-side water blocking cap 200 has the first water receiver 230 in addition to the second water receiver 220. While the driver-side water blocking cap 200 has the two water receivers 220, 230, the water blocking cap 400, which is mounted to the stem 310 of the passenger-side shaft holder 300 has only one water receiver.

Specifically, as shown in FIG. 1, the passenger-side water blocking cap 400 includes a mounting portion 410, which corresponds to the mounting portion 210 of the driver-side water blocking cap 200, and a water receiver 420, which corresponds to the second water receiver 220 of the water blocking cap 200.

Like the mounting portion 210, the mounting portion 410 is configured to be located in a position to be coaxial with the stem 310 when the water blocking cap 400 is mounted to the stem 310 of the shaft holder 300.

Also, like the second water receiver 220, the water receiver 420 is integrated with the mounting portion 410, and the water receiver 420 includes a drain port 425 for draining water in a predetermined direction.

As described above, the driver-side water blocking cap 200 is provided with the two water receivers 220, 230, while the passenger-side water blocking cap 400 is provided with the single water receiver 420 for of the following reasons.

As described above, this wiper device is of the tandem system, in which the passenger-side pivot shaft 16b is positioned on the center side in the vehicle width direction, while the driver-side pivot shaft 16a is positioned on the outer side in the vehicle width direction. Water, such as rain water, may flow into the vicinity of the stem 110 from the outer side in the vehicle width direction along members such as a side member outer panel. A drip molding extending in the vehicle width direction is provided in the vicinity of the lower end of the windshield of the vehicle. Water, such as rain water, flows along the drip molding to be drained from adequate positions. However, since the frame to which the fixed portion 130 is fixed is located near the stem 110 of the driver-side shaft holder 100, no drip molding is provided in the vicinity of the stem 110. Therefore, with such a drip molding alone, water, such as rain water, that flows into the vicinity of the stem 110 from the outer side in the vehicle width direction cannot be drained to adequate positions.

The driver-side pivot lever 13a is pivoted to a position below the fixed portion 130 when the wiper device is operating. Therefore, if the first water receiver 230 is not provided in the driver-side water blocking cap 200, water, such as rain water, that flows to the vicinity of the stem 110 from the outer side in the vehicle width direction may be splashed onto the pivot lever 13a.

In contrast, the passenger-side shaft holder 300 is arranged on the center side in the vehicle width direction, on which the drip molding is provided. Thus, water, such as rain water, flowing from the outside in the vehicle width direction scarcely flows into the vicinity of the shaft holder 300. Therefore, the passenger-side water blocking cap 400 does not need to have a water receiver for restraining splashing onto the pivot lever 13b, such as the first water receiver 230 in the driver-side water blocking cap 200.

Consequently, when the mounting portion 410 of the passenger-side water blocking cap 400 is mounted to the stem 310 of the passenger-side shaft holder 300, the mounting portion 410 is allowed to be mounted through simple operation of inserting the mounting portion 410 from the distal side toward the proximal side in the axial direction of the stem 310.

On the other hand, as described above, in order to restrain water from being splashed onto the driver-side pivot lever 13a, it is effective to arrange the first water receiver 230 above the pivot lever 13a. However, to be arranged in such a position, the first water receiver 230 would have to be arranged below the fixed portion 130.

In that case, when mounting the mounting portion 210 of the driver-side water blocking cap 200 to the stem 110 of the driver-side shaft holder 100, the mounting portion 210 cannot be mounted by simply being inserted from the distal side toward the proximal side in the axial direction of the stem 110. Specifically, in a mounted state in which the mounting portion 210 is mounted to the stem 110 as shown in FIG. 6, a part (the drain port 235) of the first water receiver 230 is located closer to the proximal side than the fixed portion 130 and is located in a position in which the part overlaps with the fixed portion 130 as viewed from the axial direction of the stem 110. Thus, when the water blocking cap 200 is moved from the distal side toward the proximal side in the axial direction of the stem 110, the fixed portion 130 interferes with a part (the drain port 235) of the first water receiver 230. The water blocking cap 200 thus cannot be mounted.

To solve this problem, when mounting the driver-side water blocking cap 200 to the driver-side shaft holder 100, the mounting portion 210 of the water blocking cap 200 is first arranged at the distal end of the stem 110 of the shaft holder 100. At this time, the axis of the stem 110 and the axis of the mounting portion 210 are aligned with each other. Also, the water blocking cap 200 is arranged such that the fixed portion 130 and the first water receiver 230 of the water blocking cap 200 do not overlap with each other as viewed from the axial direction of the stem 110. Then, while being moved toward the proximal end, the water blocking cap 200 is rotated such that the fixed portion 130 and the first water receiver 230 do not interfere with each other to mount the water blocking cap 200. Such a mounting method allows the water blocking cap 200 to be mounted in a desired position without interfering with the fixed portion 130.

Figure 8:
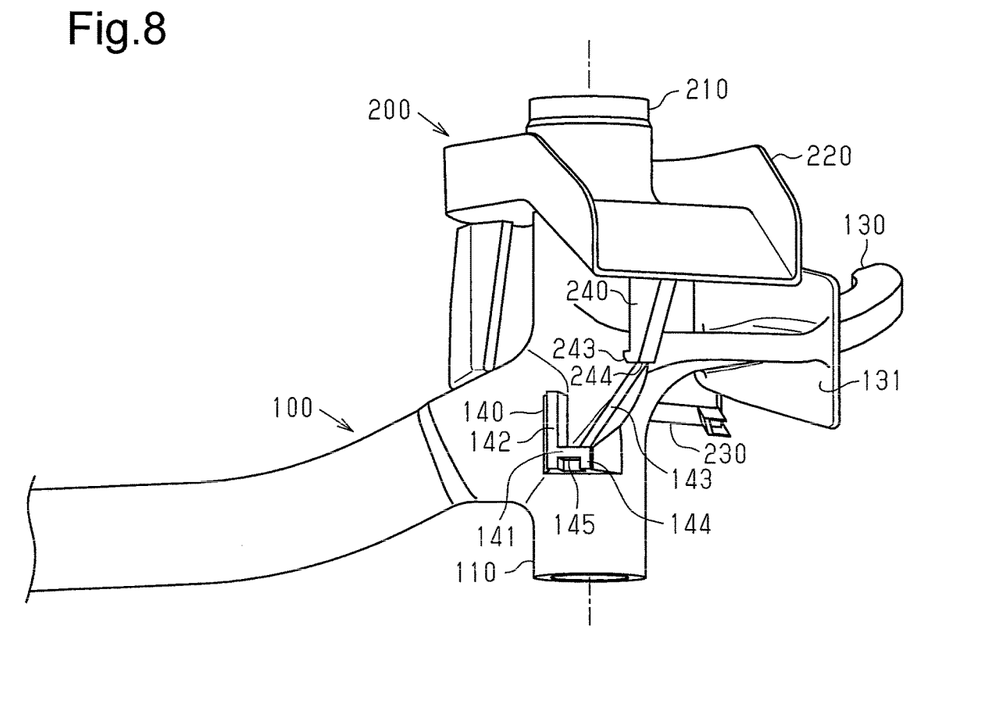
FIG. 8 is a front view showing the position of the water blocking cap at the time of starting operation for mounting the cap to the driver-side shaft holder in the wiper device.

Next, referring to FIGS. 8 to 10, operation and effects at the time of mounting the shaft holder 100 and the water blocking cap 200 will be described. The shaft holder 100 and the water blocking cap 200 have a mounting structure for more easily implementing the above described mounting method.

First, when mounting the water blocking cap 200 to the driver-side shaft holder 100, the mounting portion 210 of the water blocking cap 200 is arranged at the distal end of the stem 110 of the shaft holder 100 (a step for mounting the mounting portion 210 to the stem 110). At this time, the axis of the stem 110 and the axis of the mounting portion 210 are aligned with each other. Further, the water blocking cap 200 is arranged in a position in which the distal side (the upper end in FIG. 8) of the inclined portion 143 of the guide portion 140 and the guided portion 240 of the water blocking cap 200 overlap with each other as viewed from the axial direction of the stem 110.

From this state, the water blocking cap 200 is moved toward the proximal side in the axial direction of the stem 110. This inserts the stem 110 into the mounting portion 210. Further, when the water blocking cap 200 is moved toward the proximal side of the stem 110, the guide portion 140 of the shaft holder 100 and the guided portion 240 of the water blocking cap 200 contact each other, as shown in FIG. 8. Specifically, the bottom surface 244 of the guided portion 240 contacts the distal end of the inclined portion 143 of the guide portion 140.

Figure 9:
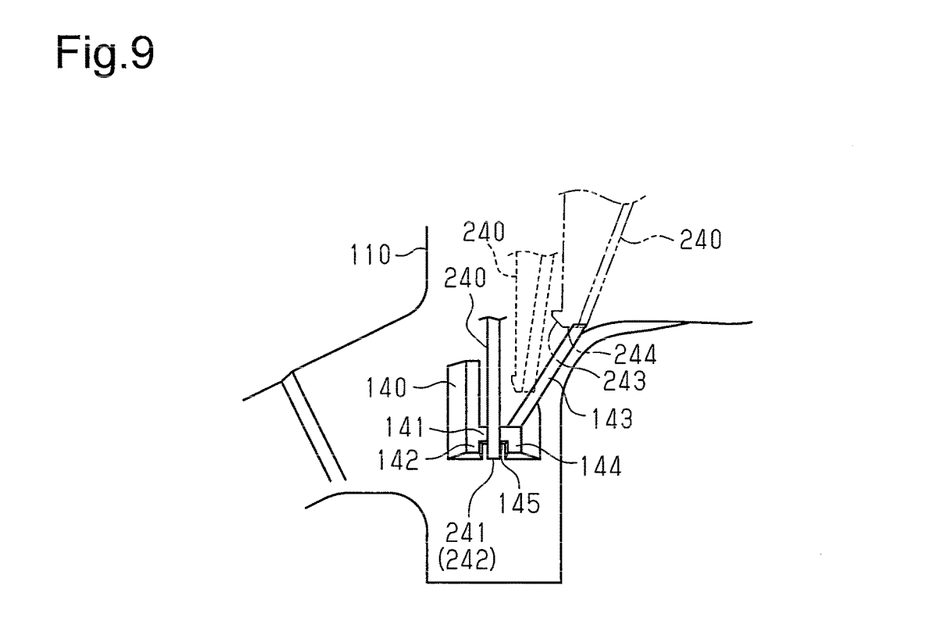
FIG. 9 is a front view showing operation of the guide portion when the water blocking cap is being mounted to the driver-side shaft holder in the wiper device.

As represented by the long dashed double-short dashed lines in FIG. 9, when the inclined portion 143 of the guide portion 140 and the guided portion 240 start contacting each other, the guided portion 240 contacts a part of the inclined portion 143 at the distal end and the right end in FIG. 9.

Figure 10:
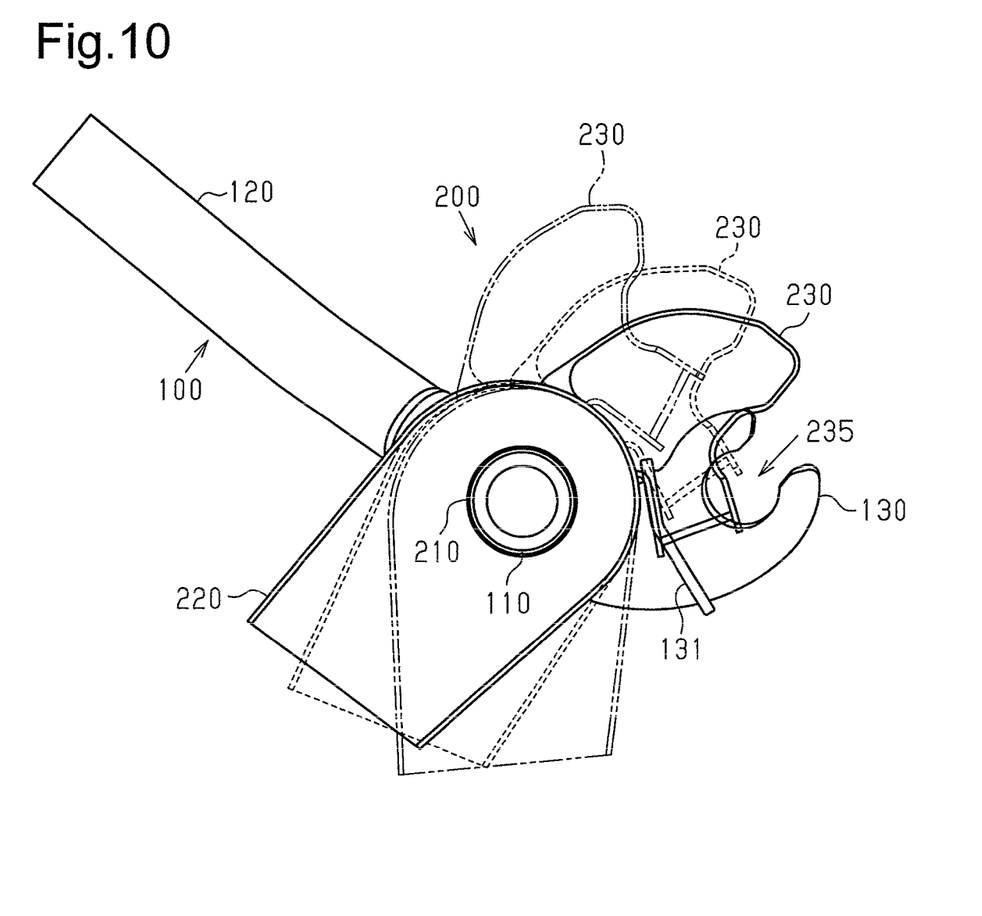
FIG. 10 is a plan view showing changes in the orientation of the water blocking cap when the water blocking cap is being mounted to the driver-side shaft holder in the wiper device.

In this state, the water blocking cap 200 is located in a position indicated by the long dashed double-short dashed lines in FIG. 10. That is, the first water receiver 230 is located in a position deviated counterclockwise in the circumferential direction of the stem 110 from the fixed portion 130. Thus, at this time, as viewed from the axial direction of the stem 110, the fixed portion 130 and the first water receiver 230 are in positions that do not overlap with each other. Therefore, at this time, the fixed portion 130 and the first water receiver 230 do not interfere with each other.

When a force is applied to move the water blocking cap 200 further toward the proximal side in the axial direction of the stem 110 from the state indicated by the long dashed double-short dashed lines in FIG. 9, the guided portion 240 (the water blocking cap 200) moves toward the left side in FIG. 9 while moving toward the proximal side in the axial direction of the stem 110. This corresponds to a step of moving the water blocking cap 200 in a direction intersecting with the axial direction of the stem 110 while moving the water blocking cap 200 from the distal side toward the proximal side of the stem 110. This rotates the water blocking cap 200 around the stem 110.

At this time, the orientation of the water blocking cap 200 is changed from the orientation indicated by the long dashed double-short dashed lines in FIG. 10 to the orientation indicated by the broken lines. That is, the first water receiver 230 and the second water receiver 220 of the water blocking cap 200 move clockwise in the circumferential direction of the stem 110. Specifically, the first water receiver 230 moves toward the fixed portion 130 in the circumferential direction of the stem 110. In a state indicated by the broken lines in FIG. 10, the fixed portion 130 and the drain port 235 of the first water receiver 230 start overlapping with each other as viewed from the axial direction of the stem 110. In this state, since the drain port 235 of the first water receiver 230 is positioned closer to the proximal side than the fixed portion 130 in the axial direction of the stem 110, the fixed portion 130 and the drain port 235 of the first water receiver 230 do not interfere with each other.

When a force is applied to move the water blocking cap 200 further toward the proximal side in the axial direction of the stem 110 from the state indicated by the broken lines in FIG. 9, the guided portion 240 (the water blocking cap 200) moves toward the left side in FIG. 9 while moving further toward the proximal side in the axial direction of the stem 110. This corresponds to a step of moving the water blocking cap 200 in a direction intersecting with the axial direction of the stem 110 while moving the water blocking cap 200 from the distal side toward the proximal side of the stem 110.

Then, the bottom surface 244 of the guided portion 240 contacts the bottom 141 of the guide portion 140. From this state, when a force is applied to move the water blocking cap 200 further toward the proximal side in the axial direction of the stem 110, a force in the axial direction of the stem 110 is transmitted from the guided portion 240 to the second water receiver 220. Then, the second water receiver 220 is elastically deformed in the axial direction of the stem 110, and accordingly, the guided portion 240 moves outward in the radial direction of the stem 110. Eventually, the slant 243 of the guided portion 240 contacts the bottom 141 of the guide portion 140. Further, when a force is applied to move the water blocking cap 200 toward the proximal side in the axial direction of the stem 110, the slant 243 of the engaging projection 242 of the guided portion 240 contacts the bottom 141, so that the distal end of the guided portion 240 acts to move outward in the radial direction of the stem 110. Then, the guided portion 240 elastically deforms outward in the radial direction of the stem 110, so that the engaging projection 242 is located radially outward of the bottom 141 of the guide portion 140.

Subsequently, when a force is applied to move the water blocking cap 200 toward the proximal side in the axial direction of the stem 110, the water blocking cap 200 moves to a position where the leg 250 of the water blocking cap 200 and the base 150 of the shaft holder 100 contact each other. When the leg 250 of the water blocking cap 200 and the base 150 of the shaft holder 100 contact each other, movement of the water blocking cap 200 toward the proximal side is restricted, and the water blocking cap 200 comes to be supported by the shaft holder 100.

At this time, the engaging portion 145 and the engaging projection 242 are at the same position in the axial direction of the stem 110 as indicated by the solid lines in FIGS. 7 and 9. Thus, the engaging projection 242 of the guided portion 240 moves inward in the radial direction of the stem 110 by the restoring force of the guided portion 240, which has been elastically deformed. The engaging projection 242 and the engaging portion 145 thus engage with each other. As a result, the position of the water blocking cap 200 is restricted with respect to the circumferential direction and the axial direction of the stem 110 of the shaft holder 100. The engaging portion 145 corresponds to an engaging portion that engages with the water blocking cap 200.

Further, as the guided portion 240 moves from the position indicated by the broken line in FIG. 9 to the position indicated by the solid line, the water blocking cap 200 rotates around the axis of the stem 110.

At this time, the orientation of the water blocking cap 200 is changed from the orientation indicated by the broken lines in FIG. 10 to the orientation indicated by the solid lines. That is, the first water receiver 230 and the second water receiver 220 of the water blocking cap 200 move clockwise further in the circumferential direction of the stem 110. That is, the first water receiver 230 moves further toward the fixed portion 130 in the circumferential direction of the stem 110. The drain port 235 of the first water receiver 230 overlaps with the fixed portion 130 by a greater amount as viewed from the axial direction of the stem 110, and is arranged closer to the proximal side than the fixed portion 130 in the axial direction of the stem 110. This corresponds to a step in which, in a mounted state where the mounting portion 210 is mounted to the stem 110, part of the first water receiver 230 is arranged in a position that is closer to the proximal side than the fixed portion 130 and in which the part overlaps with the fixed portion 130 as viewed from the axial direction of the stem 110.

Also, as shown in FIG. 5, the above described second water receiver 220 is arranged such that, when the water blocking cap 200 is mounted to the shaft holder 100, the second water receiver 220 is positioned closer to the distal side of the stem 110 than the fixed portion 130 and closer to the passenger seat than the flange 131 of the fixed portion 130. Therefore, the second water receiver 220 does not interfere with the fixed portion 130 when the water blocking cap 200 is mounted to the shaft holder 100.

As described above, when the water blocking cap 200 is mounted to the driver-side shaft holder 100, the water blocking cap 200 is moved from the distal side toward the proximal side in the axial direction of the stem 110. At this time, the guided portion 240 is guided by the guide portion 140 by utilizing the contacting relationship between the inclined portion 143 of the guide portion 140 and the guided portion 240, and the water blocking cap 200 is rotated in the circumferential direction of the stem 110. As described above, the present embodiment employs a mounting method in which, while the mounting portion 210 of the water blocking cap 200 is moved from the distal side toward the proximal side of the stem 110 of the shaft holder 100, the mounting portion 210 is moved in a direction intersecting with the axial direction of the stem 110. When the mounting operation is started, the first water receiver 230 is located in a position not overlapping with the fixed portion 130 as viewed from the axial direction of the stem 110. As the operation progresses, the present invention allows the first water receiver 230 to be arranged in a position that overlaps with the fixed portion 130 as viewed from the axial direction of the stem 110, and is closer to the proximal side than the fixed portion 130. This allows the first water receiver 230 of the water blocking cap 200 to be arranged in a desired position to receive water, such as rain water.

In the mounting structure of the above described embodiment, the guide portion 140 is provided on the shaft holder 100, and the movement of the water blocking cap 200 in a direction intersecting with the axial direction of the stem 110 of the shaft holder 100 is enabled by the contacting relationship between the guided portion 240 of the water blocking cap 200 and the guide portion 140.

Therefore, when mounting the water blocking cap 200, even if no force in a direction intersecting with the axial direction of the stem 110 of the shaft holder 100 is applied to the water blocking cap 200, the water blocking cap 200 is moved in a direction intersecting with the axial direction of the stem 110 by utilizing some of the force for moving the cap 200 toward the proximal side of the stem 110.

That is, a simple mounting operation of moving the water blocking cap 200 from the distal side toward the proximal side of the stem 110 of the shaft holder 100 allows the first water receiver 230 to be arranged on the proximal side in the axial direction of the stem 110 in the fixed portion 130, while preventing the first water receiver 230 from interfering with the fixed portion 130.

The above described embodiment achieves the following advantages.

(1) In the mounted state in which the mounting of the water blocking cap 200 to the shaft holder 100 is completed, the engaging portion 145 of the shaft holder 100 and the engaging projection 242 of the water protection cap 200 engage with each other. Thus, in the mounted state, in which the mounting is completed, the water blocking cap 200 is restricted from moving in the circumferential direction and the axial direction of the stem 110 of the shaft holder 100. Therefore, with the completion of the mounting, the water blocking cap 200 is positioned with respect to the shaft holder 100.

(2) The engaging portion 145 is provided in the guide portion 140, and the engaging projection 242 is provided in the guided portion 240. Therefore, the engaging portion 145 and the engaging projection 242 for positioning are provided on members that achieve the contacting relationship for guiding the movement of the water blocking cap 200. That is, the guide portion 140 and the guided portion 240 also serve as members for positioning. Therefore, compared with a case where such a positioning function is implemented by members different from the guide portion 140 and the guided portion 240, an increase in the number of components is suppressed.

(3) The water-blocking cap 200 includes the mounting portion 210, the first water receiver 230, and the second water receiver 220, which are integrated. Therefore, when the water blocking cap 200 is mounted to the shaft holder 100, the second water receiver 220 is allowed to be arranged in a desired position together with the first water receiver 230 by the contact relationship between the inclined portion 143 of the guide portion 140 and the guided portion 240.

(4) When the mounting portion 210 of the water blocking cap 200 is mounted to the stem 110 of the shaft holder 100, the stem 110 is inserted into the mounting portion 210. After the insertion, the movement of the water blocking cap 200 with respect to the stem 110 is restricted by the relationship between the outer diameter of the stem 110 and the inner diameter of the mounting portion 210. Specifically, movements of the water blocking cap 200 are restricted except for the movement in the axial direction of the stem 110 and the rotation in the circumferential direction of the stem 110. Thus, after the insertion, it is easy to cause the guided portion 240 of the water blocking cap 200 to contact a predetermined position of the guide portion 140 of the shaft holder 100. As a result, it is easy to mount the mounting portion 210 of the water blocking cap 200 to the stem 110 of the shaft holder 100.

(5) As described above, if a water blocking cap is moved in a direction intersecting with the axial direction of the stem 110 of the shaft holder 100 as well as in the axial direction to avoid interference between the first water receiver 230 and the fixed portion 130, the size of the water receiver 230 cannot be greatly increased in some cases. In contrast, the water blocking cap 200 of the above illustrated embodiment further includes the second water receiver 220. When the water blocking cap 200 is mounted by being moved from the distal side toward the proximal side of the stem 110 of the shaft holder 100, the second water receiver 220 does not interfere with the fixed portion 130. By employing the water blocking cap 200, the second water receiver 220 covers a range that cannot be covered by the first water receiver 230. Therefore, as compared with a case where only one water receiver is provided, it is possible to restrain splashing of water in a wider range while avoiding the interference between the water blocking cap 200 and the fixed portion 130.

The above illustrated embodiment may be modified as follows.

In the above illustrated embodiment, the stem 110 is inserted through the cylindrical mounting portion 210. However, the mounting portion 210 does not necessarily need to be cylindrical. For example, the mounting portion 210 may have a U-shaped cross section. In that case also, as the guide portion 140 and the guided portion 240 contact each other, the water blocking cap 200 is rotated in the circumferential direction of the stem 110 while being moved in the axial direction of the stem 110 toward the proximal side.

The above illustrated embodiment includes the guide portion 140 that rotates the stem 110 in the circumferential direction, while moving the water blocking cap 200 toward the proximal side in the axial direction of the stem 110 of the shaft holder 100. The present invention is not limited to the configuration for moving the cap 200 in the circumferential direction of the stem 110 as long as the water blocking cap 200 and the fixed portion 130 are prevented from interfering with each other. That is, a guide portion may be employed that moves the water blocking cap 200 in another direction that intersects with the axial direction of the stem 110. For example, in the case of employing the mounting portion 210 having a U-shaped cross section as described above, it is possible to provide a guide portion that guides the water blocking cap 200 to move obliquely with respect to the axial direction of the stem 110. In this case, when the guide portion and the guided portion start contacting each other, the mounting portion 210 is located radially outward of the stem 110. From that position, the guide portion guides the movement of the water blocking cap 200 while moving the water blocking cap 200 toward the proximal side in the axial direction of the stem 110, so that the cap moves from the radially outer side toward the radially inner side of the stem 110. Then, it is only necessary that the mounting portion 210 is mounted to the stem 110 in a predetermined position when the mounting of the water blocking cap 200 to the shaft holder 100 is completed.

In the above illustrated embodiment, the shaft holder 100 has the guide portion 140 having the inclined portion 143, and the water blocking cap 200 has the guided portion 240 projecting in the axial direction of the mounting portion 210. However, the mounting structure may be embodied through other configurations. For example, the shaft holder 100 may include a guided portion projecting from the stem 110, and the water blocking cap 200 may include a guide portion having an inclined portion. In this case, the inclined portion is inclined such that, as the distance from one end in the circumferential direction of the mounting portion 210 decreases, the distance from the distal side of the mounting portion 210 decreases. The inclined portion extends perpendicular to the axis of the mounting portion 210 in the radial direction of the mounting portion 210. Even with this configuration, the water blocking cap 200 is allowed to be moved relative to the stem 110 by using the contacting relationship between the guide portion and the guided portion, as in the case of the above illustrated embodiment.

In the above illustrated embodiment, the guided portion 240 is provided in the water blocking cap 200, but the guided portion 240 may be omitted. For example, the guide portion 140 on the shaft holder 100 and a part of the water blocking cap 200 may be caused to contact each other so that the water blocking cap 200 is rotated in the circumferential direction of the stem 110 while being moved toward the proximal side in the axial direction of the stem 110.

In the above illustrated embodiment, the water blocking cap 200 is restricted from moving in the circumferential direction and the axial direction of the stem 110 by causing the engaging portion 145 in the guide portion 140 engage with the engaging projection 242 of the water blocking cap 200. However, it is not necessarily required to provide such a mechanism for positioning at completion of mounting.

In addition, in the case of providing a mechanism for restricting movement by causing members to engage with each other like the engaging portion 145 and the engaging projection 242, it is not necessarily required to provide the engaging portion 145 in the guide portion 140. For example, the stem 110 of the shaft holder 100 may include an engaging portion that engages with an engaging projection, separately from the guide portion 140. This configuration is capable of restricting movement of the water blocking cap 200.

In the above illustrated embodiment, the engaging portion 145 is provided as the engaging portion in the guide portion 140 of the shaft holder 100, but the present invention is not limited to this. For example, a projection may be provided as an engaging portion that engages with a part of the water blocking cap 200. This configuration is capable of restricting movement of the water blocking cap 200 in the circumferential direction and the axial direction of the stem 110.

In the above illustrated embodiment, the water blocking cap 200 includes the second water receiver 220, in addition to the first water receiver 230. The number of the water receivers provided in the water blocking cap 200 is not limited to two. For example, the water-blocking cap 200 may have only one water receiver or three or more water receivers.

In the above illustrated embodiment, the shaft holder 100 includes the guide portion 140. The embodiment also implements the mounting method, in which the water blocking cap 200 is guided to move in the axial direction of the stem 110, and is allowed to rotate in the circumferential direction of the stem 110. However, the mounting method does not necessarily require the guide portion 140. Therefore, the guide portion 140 may be omitted. For example, when mounting the mounting portion 210 of the water blocking cap 200 to the stem 110 of the shaft holder 100, the water blocking cap 200 is moved in a direction intersecting with the axial direction of the stem 110, while being moved from the distal side toward the proximal side of the stem 110. Then, a part of the first water receiver 230 of the water blocking cap 200 is arranged in a position that is closer to the proximal side than the fixed portion 130 and in which the part overlaps with the fixed portion 130 as viewed from the axial direction of the stem 110.

The above illustrated embodiment includes the guide portion 140, which projects in the radial direction of the stem 110 of the shaft holder 100. However, the guide portion 140 does not necessarily need to project. For example, a recess dented in the radial direction of the stem 110 may be provided in the outer peripheral surface of the stem 110. Also in this case, part of the water blocking cap 200 is caused to contact the recess, and the waterproof cap 200 is guided to a desired position by the contacting relationship with this recessed portion.

In the above illustrated embodiment, the first water receiver 230 is arranged in a position where the first water receiver 230 receives water, such as rain water, flowing into the vicinity of the stem 110 from the outer side in the vehicle width direction. The present invention is not limited to this, but may be applied to any configuration as long as it is necessary to arrange the first water receiver 230 in a position closer to the proximal side than the fixed portion 130 in the axial direction of the stem 110 when the water blocking cap 200 is mounted to the shaft holder 100.

In the wiper device of the above illustrated embodiment, the mounting structure is employed in the shaft holder 100 and the driver-side water blocking cap 200, but is not employed in the shaft holder 300 and the passenger-side water blocking cap 400. However, the present invention is not limited to this. For example, the same mounting structure may be employed in the shaft holder 300 and the passenger-side water blocking cap 400.

In the above illustrated embodiment, the mounting method for rotating the water blocking cap 200 in the circumferential direction of the stem 110 while moving the cap 200 in the axial direction of the stem 110, and the mounting structure for implementing the mounting method are employed in a wiper device of the tandem system. The mounting method and structure may be employed in wiper devices other than wiper devices of the tandem system. For example, the mounting method and structure may be employed in wiper devices of the opposed system.

In the above illustrated embodiment, the first water receiver 230 and the second water receiver 220 constitute separate flow paths, and respectively have the drain port 235 and the drain port 225. The present invention is not limited to this. For example, the first water receiver 230 and the second water receiver 220 may be connected to provide a common flow path and have a common drain port. For example, when the water blocking cap 200 is mounted to the shaft holder 100, a bypass passage through which water flows may be provided from the second water receiver 220, which is positioned on the upper side in the vertical direction, to the first water receiver 230, which is positioned on the lower side in the vertical direction. Water flowing from the second water receiver 220 to the first water receiver 230 via the bypass passage may be drained from the drain port 235. In this case, the drain port 225 of the second water receiver 220 may be omitted.

In the above illustrated embodiment, when the water blocking cap 200 is mounted to the stem 110 of the shaft holder 100, the bottom surface 244 of the guided portion 240 contacts the bottom 141 of the guide portion 140, and then the slant 243 contacts the bottom 141. The present invention is not limited to this, and the slant 243 of the guided portion 240 may contact the bottom 141 of the guide portion 140. For example, the bottom surface 244 may be omitted from the distal end of the guided portion 240, and the entire distal end of the guided portion 240 may constitute the slant 243. In that case, the slant 243 of the guided portion 240 is caused to contact the bottom 141 of the guide portion 140 at the initial stage of contacting.

Therefore, the present examples and embodiments are to be considered as illustrative and not restrictive and the invention is not to be limited to the details given herein, but may be modified within the scope and equivalence of the appended claims.

The invention claimed is:

1. A device comprising:
    a shaft holder; and
    a water blocking cap, wherein:
    the shaft holder includes
        a tubular stem configured such that a pivot shaft of a wiper arm is capable of being inserted through the stem, and
        a fixed portion configured to extend from the stem and outward in a radial direction of the stem and to be fixed to a vehicle body,
    the water blocking cap includes
        a mounting portion mounted to the stem, and
        a water receiver that is connected to the mounting portion and constitutes a flow path configured to drain water in a predetermined direction,
    one of the shaft holder and the water blocking cap includes a guide portion, wherein, when the water blocking cap is mounted to the stem by moving the water blocking cap from a distal side toward a proximal side of the stem, the guide portion contacts a part of the other one of the shaft holder and the water blocking cap, thereby moving the water blocking cap in a direction intersecting with an axial direction of the stem, and in a mounted state in which the mounting portion is mounted to the stem, a part of the water receiver is arranged in a position that is closer to the proximal side of the stem than the fixed portion and in which the part overlaps with the fixed portion as viewed from the axial direction of the stem.

2. The device according to claim 1, wherein
the guide portion includes an engaging portion that, in the mounted state, engages with a part of one of the shaft holder and the water blocking cap that is configured without the guide portion, and
the engagement of the engaging portion restricts movement of the water blocking cap in the intersecting with the axial direction of the stem.

3. The device according to claim 1, wherein
the water receiver is a first water receiver,
the water blocking cap further includes a second water receiver that constitutes a flow path different from the one constituted by the first water receiver,
in the mounted state, a part of the first water receiver is arranged in a position that is closer to the proximal side than the fixed portion and in which the part overlaps with the fixed portion as viewed from the axial direction of the stem, and
the second water receiver is arranged in a position where the second water receiver does not interfere with the fixed portion when the mounting portion is mounted to the stem.

4. The device according to claim 1, wherein
the stem is cylindrical,
the mounting portion has a cylindrical shape through which the stem is inserted,
the guide portion is provided on the shaft holder and has an inclined portion that extends in a circumferential direction of the stem, and the inclined portion is inclined such that the closer to a side in the circumferential direction of the stem, the shorter a distance from the proximal side becomes.

5. A wiper device comprising:
a shaft holder that pivotally supports a pivot shaft of a wiper arm; and
a water blocking cap mounted to the shaft holder, wherein
the shaft holder includes
    a tubular stem through which the pivot shaft is inserted, and
    a fixed portion that extends from the stem and outward in a radial direction of the stem and is fixed to a vehicle body,
the water blocking cap includes
    a mounting portion mounted to the stem, and
    a water receiver that is connected to the mounting portion and constitutes a flow path configured to drain water in a predetermined direction,
one of the shaft holder and the water blocking cap includes a guide portion, wherein, when the water blocking cap is mounted to the stem by moving the water blocking cap from a distal side toward a proximal side of the stem, the guide portion contacts a part of the other one of the shaft holder and the water blocking cap, thereby moving the water blocking cap in a direction intersecting with an axial direction of the stem, and
in a mounted state in which the mounting portion is mounted to the stem, a part of the water receiver is arranged in a position that is closer to the proximal side of the stem than the fixed portion and in which the part overlaps with the fixed portion as viewed from the axial direction of the stem.

* * * * *